United States Patent
Mead et al.

(10) Patent No.: US 8,437,893 B2
(45) Date of Patent: May 7, 2013

(54) DETERMINING CURRENT METEOROLOGICAL CONDITIONS SPECIFIC TO AN AIRCRAFT

(75) Inventors: Robert W. Mead, Covington, WA (US); Louis J. Bailey, Kent, WA (US); Paul D. Hansen, Kent, WA (US); Ferdinando Dijkstra, Amstelveen (NL)

(73) Assignee: The Boeing Company, Chicago, IL (US)

( * ) Notice: Subject to any disclaimer, the term of this patent is extended or adjusted under 35 U.S.C. 154(b) by 1177 days.

(21) Appl. No.: 12/042,904

(22) Filed: Mar. 5, 2008

(65) Prior Publication Data

US 2009/0012663 A1  Jan. 8, 2009

(51) Int. Cl.
*G06F 7/70* (2006.01)
(52) U.S. Cl.
USPC .................................. 701/14; 701/3; 701/408
(58) Field of Classification Search .................. 701/3, 4, 701/14, 200, 209, 300; 340/945
See application file for complete search history.

(56) References Cited

U.S. PATENT DOCUMENTS

| | | | | |
|---|---|---|---|---|
| 4,831,538 A | * | 5/1989 | Cucchiari et al. | 701/200 |
| 5,056,027 A | * | 10/1991 | Kahler | 701/3 |
| 6,501,392 B2 | * | 12/2002 | Gremmert et al. | 340/971 |
| 6,563,452 B1 | * | 5/2003 | Zheng et al. | 342/26 R |
| 6,828,922 B1 | * | 12/2004 | Gremmert et al. | 340/949 |
| 6,937,937 B1 | * | 8/2005 | Manfred et al. | 702/2 |
| 7,069,147 B2 | * | 6/2006 | Manfred et al. | 702/2 |
| 7,467,031 B2 | * | 12/2008 | King | 701/4 |
| 7,633,428 B1 | * | 12/2009 | McCusker et al. | 342/26 B |
| 7,668,656 B2 | * | 2/2010 | Southard et al. | 701/300 |
| 7,698,927 B2 | * | 4/2010 | Spinelli et al. | 73/29.01 |
| 7,808,377 B2 | * | 10/2010 | Shafaat et al. | 340/506 |
| 2002/0039072 A1 | * | 4/2002 | Gremmert et al. | 340/945 |
| 2002/0098800 A1 | * | 7/2002 | Frazita et al. | 455/12.1 |
| 2003/0086605 A1 | * | 5/2003 | Doner | 382/166 |
| 2003/0225488 A1 | * | 12/2003 | Heller et al. | 701/4 |
| 2004/0239550 A1 | * | 12/2004 | Daly, Jr. | 342/26 B |
| 2004/0244476 A1 | * | 12/2004 | Andrews et al. | 73/170.01 |
| 2005/0278120 A1 | * | 12/2005 | Manfred et al. | 702/2 |
| 2007/0127406 A1 | * | 6/2007 | Tzidon | 370/316 |
| 2007/0138345 A1 | * | 6/2007 | Shuster | 244/186 |
| 2008/0103645 A1 | * | 5/2008 | DeMers et al. | 701/14 |

OTHER PUBLICATIONS

R. A. Coppenbarger and G. Kanning, "Real-Time Data Link of Aircraft Parameters to the Center-TRACON Automation System (CTAS)", 4th USA/Europe ATM R&D Seminar, Santa Fe, NM, Dec. 3-7, 2001; 11 pages.
C. Tamvaclis, Nick McFarlane, Billy Josefsson, "Use of Aircraft Derived Data for More Efficient ATM Operations", 0-7803-8539-X/04, IEEE 2004; pp. 3.B.4-1-3.B.4-12.

* cited by examiner

*Primary Examiner* — Helal A Algahaim
(74) *Attorney, Agent, or Firm* — Harness, Dickey & Pierce, P.L.C.

(57) ABSTRACT

A method of providing meteorological data for aeronautical use. The method includes collecting data from a plurality of data sources, processing the data to determine current meteorological conditions of a current location of an aircraft in an airspace, and providing the current meteorological conditions to the aircraft and other users as appropriate, such as airline operations centers, air navigation service providers, and national weather service providers. Based on current aircraft behavior data and guidance systems design, beneficial wind and meteorological data can be established for a given flight and its cleared route and descent path.

10 Claims, 2 Drawing Sheets

DETERMINING CURRENT METEOROLOGICAL CONDITIONS SPECIFIC TO AN AIRCRAFT

CROSS-REFERENCE TO RELATED APPLICATIONS

This application claims the benefit of U.S. Provisional Application No. 60/918,655 filed on Mar. 16, 2007. The disclosure of the above application is incorporated herein by reference.

FIELD

The present disclosure relates to providing meteorological information for aeronautical use.

BACKGROUND

The statements in this section merely provide background information related to the present disclosure and may not constitute prior art. In the planning and execution of aircraft flight operations, it is desirable for both ground and aircraft systems to have access to current, accurate meteorological information. Although some aircraft collect and send data during flight to various ground systems, many if not most aircraft are not equipped to provide current meteorological information. Additionally, several different data communication systems are currently in use between the ground and those aircraft that are capable of delivering weather data.

Even where an aircraft might collect meteorological data, ground systems are typically unable to share the data with other aircraft because of differences among types of data utilized by the various communication systems, and because of the low number of aircraft capable of providing such data. The use of fragmented, unsynchronized, less-than-current and/or less-than-accurate meteorological data by various ground and air systems typically results in less-than-optimal aircraft fuel burn, flight plan, noise, environmental impact, and airspace capacity.

SUMMARY

In one implementation, the disclosure is directed to a method of providing meteorological data for aeronautical use. The method includes collecting data from a plurality of data sources, processing the collected data to determine current meteorological conditions of a current location of an aircraft in an airspace, and providing the current meteorological conditions to the aircraft.

In another implementation, the disclosure is directed to a method of using data from one or more sources of aeronautical information, A current meteorological condition of a portion of an airspace is determined. The determined condition is included in a representation of a plurality of current meteorological conditions in the airspace. The representation is used to obtain current meteorological information relating to a specific aircraft in the airspace. The current meteorological information is provided to the specific aircraft.

In yet another implementations the disclosure is directed to an apparatus for providing meteorological information for aeronautical use relative to an airspace. The apparatus includes a ground system and one or more aircraft in the airspace configured to transmit data to the ground system. The ground system is configured to collect data descriptive of behavior of the one or more aircraft and use the aircraft behavior data to determine one or more current meteorological conditions in the airspace. The ground system is further configured to, based on the one or more current meteorological conditions and on a profile of a specific one of the one or more aircraft, select a flight path through the airspace for the specific aircraft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

The following description is merely exemplary in nature and is not intended to limit the present disclosure, application, or uses.

In various implementations of the present disclosure, current meteorological information within a given airspace may be obtained and communicated to aircraft, ground systems, national weather services and/or other users. Such information may be used, e.g., in predicting, planning, and executing flight paths through the given airspace. Such information could be used to improve the common planning and execution of flight operations and to provide shared visibility of meteorological conditions that may be significant to such operations.

Information pertaining to current and future conditions within a given airspace may be collected in various ways. For example, where a given aircraft is equipped to downlink meteorological data, current information pertinent to that aircraft and other aircraft, e.g., meteorological conditions through which the aircraft is progressing in a given airspace, may be collected. Additionally or alternatively, and in various implementations of the disclosure, data may be collected from an aircraft that is descriptive of behavior of that aircraft. In such manner, and as further described below, substantially any aircraft passing through the airspace may serve as a source of data from which meteorological information may be derived, whether or not that aircraft is capable of directly reporting or downlinking that data to the ground system.

In accordance with some aspects of the disclosure, a system may "blend" received forecasted or current winds and temperature to a specific vehicle trajectory. For a descent path, a plurality of (typically three or four) altitudinal weather "bands" may be used in such blending. A selection of appropriate band levels (e.g., "28,000 ft, 18,000 ft, and 15,000 ft", or "39,000 ft, 25,000 ft, 10,000 ft, and surface") can have significant impact on predictability of a flight profile as well as on operational and environmental benefits accrued by the flight. In various implementations of this disclosure, appropriate band(s) for a specific aircraft may be identified based on aircraft type, profile desired, and current and forecasted meteorological conditions. The identified band(s) may be delivered to the aircraft, and/or used in ground automation to better predict and then manage execution of an optimum flight path through the airspace.

In some implementations, airborne data collected from various data sources may be integrated and used to describe current and forecasted meteorological conditions relative to a representation of the airspace. For example, meteorological data may be maintained with reference to a grid descriptive of the airspace. Data may be collected via a plurality of types of communication systems, aircraft observations, and other sources, and processed to derive essentially current and better forecasted meteorological information for delivery to various users. Such information may be derived, e.g., from partial data sets provided through the systems.

In some implementations, collected data may be used to provide a "now-cast" of current winds, temperatures and air-density ratios at various altitudes in an airspace. Such information may have sufficient granularity, e.g., to support Trajectory Prediction (TP) functions in Air Traffic Management ATM ground systems as well as for feedback to successive aircraft, e.g., to assist those aircraft in accurately predicting and then adhering to their predicted and instructed paths.

In various implementations of the disclosure, a method of providing meteorological data for aeronautical use includes collecting data from a plurality of data sources. Known protocols, interfaces and/or capabilities may be used, e.g., for down-linking such data from aircraft. Publicly available documentation of such protocols, interfaces and/or capabilities may include but is not limited to RTCA Documents DO258A and DO181C, DO260B, ICAO Doc 9705, ICAO Doc 9694, ARINC 718, ARINC 620, ARINC 702A, and EUROCAE document ED73B. The data is processed to determine current meteorological conditions for a current location of an aircraft in an airspace. The airspace and the current meteorological conditions may be described relative to a grid, as further described below, by bands as described above, or by 3D points in airspace. The current and forecasted meteorological conditions may then be provided to the aircraft, ground, and other users as appropriate.

Figure 1:
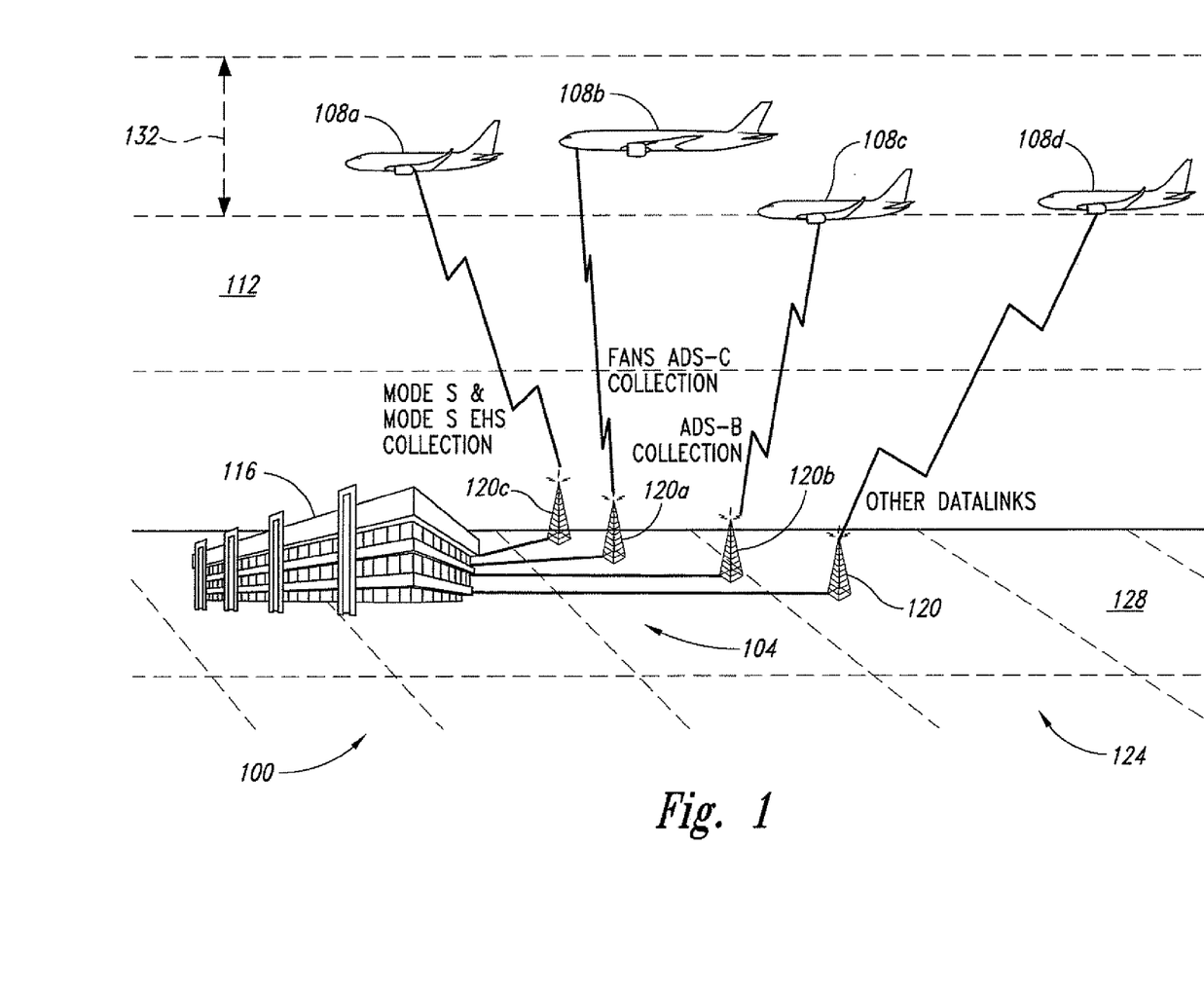
FIG. 1 is a diagram of an apparatus for providing meteorological information for aeronautical use in accordance with one implementation of the disclosure.

One configuration of an apparatus for providing meteorological information for aeronautical use is indicated generally in FIG. 1 by reference number 100. The apparatus 100 includes a ground system 104 and a plurality of aircraft 108 flying through an airspace 112. The aircraft are in communication with, and/or being monitored by, the ground system 104. The ground system 104 includes a data processing center 116 and one or more access points 120 through which the aircraft 108 down-link data to the data processing center 116, or through which aircraft observation systems (e.g. Mode S) provide observed aircraft state data for use in deriving meteorological conditions, e.g., from aircraft that are not capable of downlinking data to the ground system or are capable of only partial data downlink to the ground system. It should be noted that various implementations are contemplated in which a single aircraft and/or more than one processing center may be included.

In one example, the airspace 112 is conceptually divided and incorporated into a meteorological grid 124, indicated by dashed lines in FIG. 1. The grid 124 is typically defined to include the ground 128 as well as the airspace 112. As shown in FIG. 1, the grid 124 includes a plurality of attitudinal bands 132 through which the aircraft 108 may fly. It should be noted that although the grid 124 is shown in FIG. 1 as being more or less geometrically regular, grids could be irregular and/or defined in many other or additional ways in various implementations. For example, altitudinal bands 132 could be defined with reference to air temperatures that might be prevalent through such bands. In some implementations, at least part of a grid may be dynamically defined relative, e.g., to one or more changing meteorological conditions and/or aircraft locations, etc, determined in the airspace 112. Static points could include, e.g., airports, flight service stations, weather centers, etc.

Meteorological information may be tailored to individual aircraft users during a flight. Instead of referring to the ground 128, a pilot or other user on a specific aircraft may identify, e.g., three or four specific altitude bands 132 in the airspace that would appear most appropriate for that aircraft, for that particular flight, in view of particular meteorological conditions for the targeted profile for that aircraft. In various implementations, altitude bands may be selected based on current and/or forecasted meteorological information and sent to a specific aircraft, to optimize execution of the flight path the aircraft is expected to follow.

The access points 120 collect various types of data for transmission to the processing center 116. For example, an access point 120a can provide a point-to-point path between an aircraft and the processing center 116 for transmission of Future Air Navigation System 1/A Automatic Dependent Surveillance-Contract (FANS-1/A ADS-C) data and/or Airline Operational Communications (AOC) data. The access point 120a can collect ADS-C and/or AOC data from various aircraft equipped to down-link ADS-C data to the ground system 104. As shown in FIG. 1, the aircraft 108b can down-link ADS-C and/or AOC data via the access point 120a to the processing center 116. ADS-C and/or AOC data items may include, e.g., aircraft position, identity, air temperature, wind direction, wind speed, barometric altitude, heading, airspeed, and ground speed.

An access point 120b collects Automatic Dependent Surveillance-Broadcast (ADS-B) data broadcast by one or more aircraft 108, e.g., by the aircraft 108c. ADS-B data may include some of the data items available through ADS-C and/or AOC. An access point 120c collects Mode S and Mode S Enhanced Surveillance (Mode S EHS) data from one or more aircraft 108, e.g., from the aircraft 108a. Access point 120c also provides aircraft state observation data that may be used by the ground system to derive meteorological data. An access point 120d may collect one or more other data types from one or more aircraft 108, e.g., from the aircraft 108d, and transmit the data to the processing center 116. It should be noted that other or additional types of data could be collected, processed, and used in accordance with various implementations of the disclosure. Additional or alternative communication systems could be used.

Sets of data collected from aircraft 108 through the access points 120 may vary widely in content, dependent at least in part on levels of aircraft equipage. For example, although air temperature may be requested and can be reported by the aircraft 108b via the ADS-C access point 120a, aircraft that down-link data via Mode S generally are not equipped to directly report air temperature via Mode S. Moreover, although a ground system may be capable of requesting and/or receiving data from aircraft equipped with Mode S, it may have no capability to receive data from ADS-C equipped aircraft. Accordingly, in various implementations of the disclosure and as further described below, the apparatus 100 may derive essentially current meteorological information from partial data sets for inclusion in the grid 124 and for delivery to various users. Such information may be derived even where a ground system's receiving and processing capabilities do not exactly match the sending capabilities of a given aircraft.

Where meteorological data is available directly from one or more aircraft 108 sensors, and an aircraft 108 is capable of down-linking its sensor data to the ground system 104, the apparatus 100 may use such information directly. One example of an aircraft with such a level of equipage is the aircraft 108b shown in FIG. 1. Where meteorological data is temporarily missing from an aircraft or is simply not available (as would be the case with many if not most currently operating aircraft and ground systems), such data may be derived, e.g., by combining observations of aircraft behavior, directly down-linked data, and (in some implementations) meteorological forecasts. Thus the apparatus 100 may use observations of flight behavior of a given aircraft 108, alone or together with possibly limited data delivered by aircraft where available, to determine meteorological conditions for use in, e.g., meteorological information derivation, profile calculation, prediction, and adherence.

Figure 2:
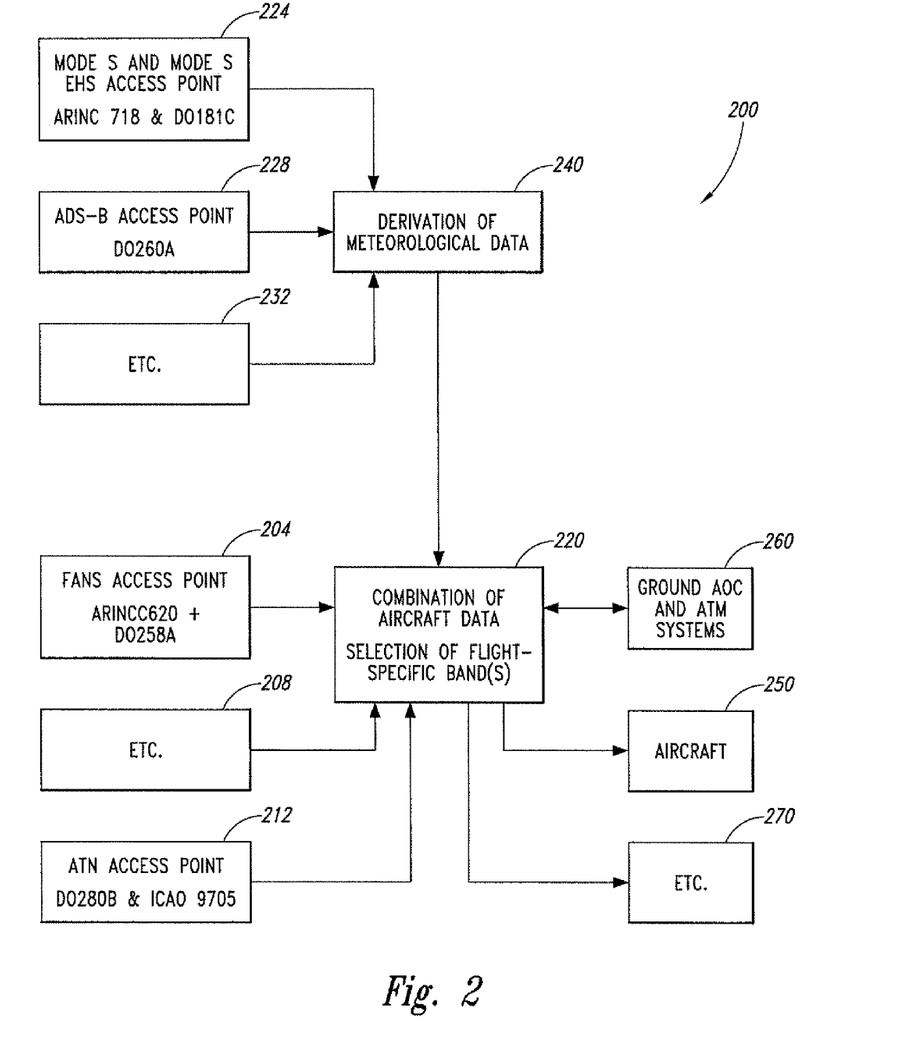
FIG. 2 is a diagram of data flow through an apparatus for providing meteorological information for aeronautical use in accordance with one implementation of the disclosure.

In one exemplary implementation, data may flow as shown in a flow diagram indicated generally in FIG. 2 by reference number 200. Data items collected via access points 204, 208 and 212 include meteorological data that can be used directly by a processing block 220. Data items collected via access points 224, 228 and 232 include, e.g., observations of aircraft behavior and/or other data items that may be used to derive meteorological data in a processing block 240. Meteorological data derived in the block 240 is combined with directly obtained meteorological data (if any) in block 220 to provide and/or maintain meteorological data relative to a grid, as previously discussed with reference to FIG. 1. In processing block 220, data may be captured, processed, and integrated with data from other weather sources such as national forecasts. The meteorological data obtained in block 220 is made available for transmission, e.g., to one or more aircraft 250. An aircraft 250 typically includes but is not limited to an aircraft from which at least part of the data processed in blocks 240 and/or 220 may have been obtained. The meteorological data obtained in block 220 is also made available for transmission, e.g., to Aircraft Operational Control Center (AOC) system(s), Air Navigation Service Provider (ANSP) ground systems, Air Traffic Management (ATM) system(s), aircraft operator ground system(s), and/or other user(s) collectively indicated in block 260, for incorporation into trajectory prediction and/or other algorithms. The meteorological data obtained in block 220 may also be made available for transmission, e.g., to other systems 270, including but not limited to one or more national meteorological services.

Functionality also may be provided in the block 220 for using the grid for selection of, e.g., a descent wind and/or other meteorological data most applicable to a given in-flight aircraft, its cleared path, and the most significant meteorological data in terms of what the aircraft can use to predict and fly the expected profile. For example, a descent path for an aircraft entering a part of the airspace from a given direction may be selected based on a profile of the aircraft and on wind(s) that may be prevailing in one or more altitudinal bands of the airspace involved, and on selection of the most significant bands in terms of impact on aircraft flight profile prediction and execution. Currently, aircraft typically use three or four altitudinal bands from cruise to runway in calculating and then executing a descent profile. Such data may be made ready for transmission to the given aircraft to ensure synchronization between the aircraft and ground systems and thereby provide a common profile definition for both systems.

Meteorological conditions pertinent to a particular aircraft may be obtained in various ways. Air temperature may be obtained in the following manner. Where one or more data sources such as an ADS-C-equipped aircraft make temperature data directly available, temperature may be requested and reported using ADS-C contracts and/or other data links. Where one or more data sources such as aircraft equipped for Mode-S EHS, ADS-B and/or other data link do not make temperature data directly available but can provide true airspeed and Mach number, temperature may be derived using true airspeed and Mach number obtained from the data source(s). Temperature may be derived using the following equation:

$$T=\sqrt{(TAS)(1852)/3600/MACH}/(1.4)(287.053) \quad (1)$$

where T represents temperature, TAS represents true airspeed, and MACH represents Mach number.

Wind direction and speed may be obtained in the following manner. Where one or more data sources such as aircraft equipped for Mode S EHS, ADS-C, ADS-B and/or other data link make ground speed and true airspeed available, wind direction and speed may be derived using the following formula:

$$Wv = GSPDv - TASv \quad (2)$$

where v indicates a vector, GSPD represents ground speed, and TAS represents true airspeed. The vector GSPDv may be obtained using true track angle, e.g., from Mode-S, ADS-C, or other data link. The vector TASv may be obtained using, e.g., magnetic heading from Mode-S EHS, ADS-B, or other data link, corrected on the ground by a local magnetic variation to derive true heading. Alternatively, true heading may be used if available, e.g., from ADS-C or other data link.

If true airspeed and/or ground speed are not available from an aircraft or other source, wind speed and direction may be obtained in the following alternative manner where observable aircraft are operating in a radar environment. Wind direction and speed vector Wv may be determined using a plurality of ground speeds and tracks, where ground speed GSPDv is observed using primary radar.

Derivation of True Airspeed and Windspeed

An aircraft airspeed vector having magnitude "TAS" may be represented as follows:

$$\underline{V}_{a/c} = V(\cos\psi \hat{i} + \sin\psi \hat{j}) \quad (3)$$

A wind speed vector may be represented as follows.

$$\underline{V}_w = V_w(-\cos\psi_w \hat{i} - \sin\psi_w \hat{j}) \quad (4)$$

An aircraft groundspeed vector may be represented as follows:

$$\underline{V}_g = \underline{V}_{a/c} + \underline{V}_w$$

$$= V(\cos\psi \hat{i} + \sin\psi \hat{j}) - V_w(\cos\psi_w \hat{i} + \sin\psi_w \hat{j})$$

$$= (V\cos\psi - V_w\cos\psi_w)\hat{i} + (V\sin\psi - V_w\sin\psi_w)\hat{j}$$

$$= V_g\cos\psi_g \hat{i} + V_g\sin\psi_g \hat{j} \quad (5)$$

Groundspeed may be derived from any given number of ground track directions. Consider a series of groundspeed vectors, at different heading azimuths $\psi_{g,i}$:

$$\begin{bmatrix} \psi_{g,1} & V_{g,1} \\ \psi_{g,2} & V_{g,2} \\ \psi_{g,3} & V_{g,3} \\ \vdots & \vdots \\ \psi_{g,Z} & V_{g,Z} \end{bmatrix}$$

To simplify notation and not overload the subscripts, the subscript "g" can be dropped:

$$\begin{bmatrix} \psi_1 & V_1 \\ \psi_2 & V_2 \\ \psi_3 & V_3 \\ \vdots & \vdots \\ \psi_Z & V_Z \end{bmatrix}$$

Thus $\underline{V}_i = V_i \cos\psi_i \hat{i} + V_i \sin\psi_i \hat{j}$, etc.
Using the following definition:

$$V_{ms} = \frac{V_1^2 + V_2^2 + V_3^2 + \ldots + V_Z^2}{Z} \quad \text{for } Z \text{ any number of headings} \quad (6)$$
$$= \frac{V_1^2 + V_2^2 + V_3^2}{3} \quad \text{for } Z = 3.$$

By theorem,
if $$\psi_i = \psi_1 + \frac{2\pi}{Z}(i-1), \text{ then } V_{ms} = V^2 + V_w^2 \quad (7)$$

By definition, $$a_i = \frac{V_i^2}{V_{ms}} - 1 \quad (8)$$

By theorem, $$a_i = \frac{V_i^2}{V_{ms}} - 1 = -\frac{2V_w V}{V_{ms}}\cos(\psi_i - \psi_w) \quad (9)$$

By definition, $$\mu = \frac{a_1^2 + a_2^2 + a_3^2 + \ldots + a_z^2}{2Z} \quad (10)$$
$$= \frac{a_1^2 + a_2^2 + a_3^2}{6} \quad \text{for } Z = 3.$$

By theorem, $$\mu = \left(\frac{V_w V}{V_{ms}}\right)^2 = \left(\frac{V_w V}{V^2 + V_w^2}\right)^2 = \frac{V_w^2}{V^2 + V_w^2} \frac{V^2}{V^2 + V_w^2} \quad (11)$$

By definition, $$b = \frac{V_w^2}{V_{ms}} \quad (12)$$

By theorem, $b^2 - b + \mu = 0$ (13)

Solutions of this quadratic equation are:

$$b_m = \frac{1}{2} - \sqrt{\frac{1}{4} - \mu} \text{ and } b_p = \frac{1}{2} + \sqrt{\frac{1}{4} - \mu} = \frac{\mu}{b_m}$$

Wind speed may be represented by:
$$V_w^2 = V_{ms} b_m \quad (14)$$

Air speed TAS may be represented by:

$$V^2 = V_{ms}(1 - b_m) = V_{ms}\left[1 - \left(\frac{1}{2} - \sqrt{\frac{1}{4} - \mu}\right)\right] \quad (15)$$
$$= V_{ms}\left[\frac{1}{2} + \sqrt{\frac{1}{4} - \mu}\right] = V_{ms} b_p$$

True air speed and wind speed are then given by $\sqrt{(vms)(bp)}$ and $\sqrt{(vms)(bm)}$ provided that true air speed exceeds the wind speed. If such is not the case, the roots are exchanged.

Wind direction may be obtained in the following manner.
Let V represent the airspeed, the "TAS" of the aircraft, and $\psi$ its heading. Let $V_w$ represent the wind speed, and $\omega_w$ the wind direction. Headings $\psi$ and $\psi_w$ are measured from the north, "azimuth". Wind direction $\psi_w$ is the direction "from" which the wind is blowing. Aircraft heading $\psi$ is in the direction "to" where the aircraft is going.

Let $V_g$ be the ground speed of the vector $\underline{V}_g$ and let $\psi_g$ be its heading. With V, $\psi$, $V_w$, and $\psi_g$ now known, $\psi_w$ can be found.
Begin with the equation:

$$\tan\psi_g = \frac{(V\sin\psi - V_w\sin\psi_w)}{(V\cos\psi - V_w\cos\psi_w)} \quad (16)$$

Accordingly, $$V\cos\psi\tan\psi_g - V_w\tan\psi_g\cos\psi_w = V\sin\psi - V_w\sin\psi_w \quad (17)$$
$$V\cos\psi\sin\psi_g - V_w\sin\psi_g\cos\psi_w = V\sin\psi\cos\psi_g - V_w\sin\psi_w\cos\psi_g$$

after multiplying both sides by $\cos\psi_g$ $$V\cos\psi\sin\psi_g - V\sin\psi\cos\psi_g = V_w\sin\psi_g\cos\psi_w - V_w\sin\psi_w\cos\psi_g$$

after collecting terms $$V(\cos\psi\sin\psi_g - \sin\psi\cos\psi_g) = V_w(\sin\psi_g\cos\psi_w - \sin\psi_w\cos\psi_g)$$
$$V\sin(\psi_g - \psi) = V_w\sin(\psi_g - \psi_w)$$
$$\sin(\psi_g - \psi_w) = \frac{V\sin(\psi_g - \psi)}{V_w} \Rightarrow \psi_g - \psi_w = \arcsin\left(\frac{V\sin(\psi_g - \psi)}{V_w}\right)$$
$$\psi_w = \psi_g - \arcsin\left(V\frac{\sin(\psi_g - \psi)}{V_w}\right)$$
$$= \psi_g + \arcsin\left(\frac{V\sin(\psi - \psi_g)}{V_w}\right)$$

Air density information from aircraft-derived data (ADD) in TP functions may be used in the following manner. The air density ratio that defines the relation between calibrated air speed CAS and true air speed TAS may be derived as follows:

$$DhD0 = SQR(CAS)/SQR(TAS) \quad (18)$$

This value is dependent on the 4D-position of the aircraft as for wind and temperature information. When converting from CAS to TAS, it eliminates the need for other information usually not available or that can be derived with a sufficient level of accuracy for use in Trajectory Prediction functions. Therefore, the TAS can be derived reliably when an air density ratio DhD0 is available as follows:

$$TAS=SQRT(SQR(CAS)/DhD0) \quad (19)$$

Air densities and ratios may also be obtained as follows. Recall the definition of standard air temperature and standard atmospheric pressure at sea level.

The air temperature at sea level, on a standard day is.

$$T_{standard}=15^{degrees}\text{C}=288.15^{degrees}\text{K}=59^{degrees}\text{F}=518.67^{degrees}\text{R}.$$

The atmospheric pressure at sea level, on a standard day is:

$$P_{standard}=2116.2166 \text{ lbs/feet}^2=14.7 \text{ lbs/inch}^2=29.92 \text{ inches Hg(mercury)}$$

The ambient pressure ratio, δ, which is the ratio of the air pressure (static) at altitude to the pressure of the air at sea level (standard day), is also a function of h:

$$\delta(h) = \frac{P_{static}}{_{standard}P_{sea\,level}} = \begin{cases} (1-.000006875*h)^{5.256}, & h \le 36089.236 \\ .2234*e^{[.00004806*(36089.239-h)]}, & h > 36089.236 \end{cases}$$

Thus, the static air pressure at altitude is $$P_{static}={}_{standard}P_{sea\,level}*\delta(h) \quad (20)$$

The mass density of the air at sea level, $\rho_{sealevel}$, on a standard day is $$\rho_{sea\,level}=0.0023769 \text{ slugs/feet}^3$$

The relative air density, σ, is $$\sigma = \frac{\rho}{\rho_{sea\,level}} = \delta(h)*\frac{518.67^{degrees}R}{T_{sea\,level}(\text{converted to degrees Rankine})} \quad (21)$$

Thus, the air density at altitude is $$\rho = \rho_{sea\,level}*\sigma = \rho_{sea\,level}*\delta(h)*\frac{518.67^{degrees}R}{T_{sea\,level}^{degrees}R} \quad (22)$$

which gives air density as a function of altitude above mean sea level and the temperature at sea level.

In various implementations, data from a plurality of aircraft flying through a given airspace can be used to populate a grid associated with the airspace. As previously discussed with reference to FIG. 1, such a grid may include fixed points, dynamic points, or a combination thereof. Data such as aircraft groundspeeds, true airspeeds, and mach, reported via automated means (e.g. Mode-S or ADS) or as derived through observation of aircraft as described above, can be used to derive air temperature(s), wind direction(s) and wind speed(s) prevailing in at least part of the airspace, e.g., in a predefined area of influence centered on an aircraft included in the grid as a moving point. It will be appreciated by those knowledgeable in the art that data smoothing methods could be used to optimize meteorological data, e.g., in various grid volumes for which data may be sparse or non-existent. Operational circumstances (such as aircraft state vector), weather conditions, and/or implementation limitations of the downlink functions used may entail additional processing and filtering of data prior to using it to populate the grid. Data may be filtered and combined using various methods known in the art, e.g., Kalman filtering and/or finite element theory.

Data obtained and/or processed as previously described can be merged with existing data in a grid that can serve as a repository of meteorological data for an airspace. Data from the grid may in turn be provided to ground TP functions and to aircraft subsequently entering the airspace which need to perform a prediction or flight through or into the airspace. Such a grid can also be integrated with forecast data from meteorological models to cater for the growing need in the ATM industry to extend the prediction and planning scales of air traffic while maintaining accuracy.

Types of data available at a given time to populate the grid can depend at least in part on type(s) of equipage of aircraft in the airspace at that time. Although data reporting by aircraft may be minimal, useful meteorological data may still be obtained in various implementations. Such data may be obtained at no cost to the aircraft operators (i.e., no air/ground messaging costs, and no special equipment costs). Such data may be collated for use, e.g., in AOC and ATM ground systems and redistributed to subsequent aircraft to facilitate synchronized aircraft and ground system prediction and execution of the flight plans and paths. The inventors anticipate that the quality of meteorological data is likely to gradually increase over time in fidelity, granularity, and accuracy as amounts of data available may be increased due to better equipped aircraft. In the mean-time, various implementations of the disclosure can provide means for obtaining meteorological data using aircraft in the airspace that have no specialized data capture or downlink equipment. Aircraft observation can be utilized to obtain baseline information for implementing the operational enhancements described.

Various parts of the aviation community can benefit from access to current wind, temperature, and other weather data made available as to a given airspace as previously described. Moreover, the aviation community is becoming increasingly interrelated through collaborative decision making (CDM) among aircraft operational control (AOC) centers, air navigation service providers (ANSPs), and the planning of movement and access by aircraft through airspace domains. Various implementations of the disclosure can provide ways not only to access information from various sources but also to ensure that the information is synchronized among aircraft, AOCS, ANSPs, and other entities. Such information can be tailored to a specific consumer. For example, a national weather service customer, an ANSP, or an AOC may desire to receive all weather in a specific airspace, irrespective of unique altitude bands or profile considerations. On the other hand, meteorological information delivered to a specific flight is likely to be tailored to provide the most significant altitude bands for the aircraft type, the specific profile that aircraft will follow, and the specific meteorological conditions along that profile during the time the aircraft will be traversing the profile. In such manner, increasingly precise decisions can be made to achieve safe, expeditious, predictable and efficient planning and movement of aircraft. Implementations of the foregoing methods and apparatus make it possible to synchronize aircraft and ground systems to provide the best meteorological data for a specific flight.

Various implementations of the present disclosure can provide a mechanism to use data available from a variety of aircraft equipment levels. A cost-beneficial meteorological information capture and distribution system is provided that determines the winds at the most influential levels in terms of optimizing the flight efficiency of a given aircraft, for a given aircraft's projected and cleared flight path, up to and including descent to the assigned runway. Wind bands, temperature, and other weather information most appropriate for optimizing the flight efficiency of a given aircraft can be selected, based on the aircraft type and its predicted and cleared flight path. Such information can be delivered to the aircraft, e.g., using data link.

Actual meteorological conditions can be derived in varying levels of fidelity based on aircraft reporting capabilities, which may range from no reporting capability to advanced reporting capability. Data can be provided for use in ATM, AOC, and other ground systems. Wind and other meteorological data from all aircraft are collated and combined, allowing derivation and selection of the winds most suited to optimizing flight efficiency for following flights from current position to destination, based on aircraft type and expected flight path.

This meteorological data can then be delivered to subsequently arriving aircraft. In this way, outputs available to aircraft can be continually improved as aircraft equipage increases, allowing a corresponding increase in benefits as equipage levels for direct downlink of meteorological data approach 100 percent. Although high-fidelity meteorological models may currently be used to feed current ATM TP-functions in ground systems and may be up-linked to aircraft guidance systems for flight path prediction and execution, such models are insufficient to achieve the accuracy that can provided by implementations of the present disclosure.

Various implementations of the disclosure can provide a gradual increase in data provision capability, with a first level of data granularity available through observation of aircraft behavior. Levels of granularity increase as additional data is available for downlink from suitably equipped aircraft. Various implementations can therefore exploit the pool of unequipped aircraft in operation today, while adding and incorporating new data sources that are already available on a small proportion of the fleet in a given airspace, but are not matured or widely fielded due to lack of a method that is feasible from a technological perspective or due to lack of apparent economic viability.

Implementations of the disclosure can provide a uniquely cost-effective means of deriving and distributing meteorological information relevant to airborne and ground trajectory prediction systems, and the equipage of the aircraft that routinely transit that airspace, without ground systems having to implement logic and communications access to obtain, fuse, and redistribute that information. Through incorporating multiple technical acquisition methods, reliable and up-to-date meteorological information suitable for the improvement of the performance of both air and ground prediction and planning functions can be cost-effectively acquired. Existing airborne technology and accepted standards can be used to downlink and acquire information from aircraft systems, thereby leveraging existing systems rather than requiring additional system deployment on aircraft not carrying a specific system for the airspace.

Information can be derived from limited down-linked data, coupled with aircraft behavior, when more comprehensive down-linking cannot be used due to either airborne equipage or ground capability to extract the information for the specific equipage type. Based on knowledge of aircraft behavior and guidance systems design, the most beneficial wind and meteorological data can be established for a given flight and its cleared route and descent path.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of providing meteorological data for aeronautical use, the method comprising:
   collecting aircraft data, including flight information data derived from downlinked data and aircraft behavior data, from a plurality of data sources relative to an aircraft;
   using a processor to process the collected aircraft behavior data to determine current and forecast meteorological conditions of a multiple locations relative to an aircraft in an airspace;
   describing the meteorological conditions relative to a representation of the airspace;
   wherein the representation comprises a plurality of bands based on altitude or by multi-dimension points determined in relation to at least one of a present or a future location of the aircraft; and
   providing meteorological conditions to the aircraft;
   wherein the meteorological conditions comprises current or forecasted conditions.

2. The method of claim 1, wherein collecting data comprises collecting current aircraft flight behavior data.

3. The method of claim 2, wherein the current meteorological conditions include at least one of the following: wind direction, wind speed, temperature, and air density.

4. The method of claim 1, further comprising using the current meteorological conditions to optimize flight efficiency of the aircraft.

5. The method of claim 1, further comprising providing the current meteorological conditions to at least one other aircraft in the airspace.

6. The method of claim 1, wherein the processing is performed to determine forecasted meteorological conditions in a forecasted location of the aircraft in the airspace, the method further comprising providing the forecasted meteorological conditions to the aircraft.

7. An apparatus for providing meteorological information for aeronautical use relative to an airspace, the apparatus comprising:
   a ground system; and
   one or more aircraft in the airspace configured to transmit data to the ground system;
   the ground system configured to:
      collect data descriptive of observed behavior of the one or more aircraft in flight, the data including at least one of true airspeed and Mach number for at least one of the aircraft, as well as information on a specific type or class of the at least one aircraft;
      use the aircraft observed behavior data to determine one or more meteorological conditions in the airspace, with the one or more conditions including air temperature, and at least one of the one or more conditions being represented in a grid in which a plurality of altitudinal weather bands are demarcated, and wherein the grid is determined in relation to a location of the aircraft during its operation; and
      based on the one or more meteorological conditions and on a profile of a specific one of the one or more aircraft, select a flight path through the airspace for the specific aircraft.

8. The apparatus of claim 7, wherein the ground system is further configured to use forecast data to determine at least one current meteorological condition.

9. The apparatus of claim 7, wherein the one or more meteorological conditions include at least one of the following: wind speed, wind direction, and temperature.

10. The apparatus of claim 7, wherein the ground system is further configured to provide the one or more meteorological conditions to one or more other ground systems and/or one or more air systems.

* * * * *

UNITED STATES PATENT AND TRADEMARK OFFICE
CERTIFICATE OF CORRECTION

PATENT NO. : 8,437,893 B2
APPLICATION NO. : 12/042904
DATED : May 7, 2013
INVENTOR(S) : Robert W. Mead et al.

It is certified that error appears in the above-identified patent and that said Letters Patent is hereby corrected as shown below:

**\*\*Title Page, Item (56)**

Insert the following heading and information:

-- Related U.S. Application Data
Provisional Application No. 60/918,655, filed March 16, 2007. --\*\*

Signed and Sealed this
Second Day of July, 2013

Teresa Stanek Rea
*Acting Director of the United States Patent and Trademark Office*